United States Patent
Levy et al.

(10) Patent No.: US 10,178,029 B2
(45) Date of Patent: Jan. 8, 2019

(54) FORWARDING OF ADAPTIVE ROUTING NOTIFICATIONS

(71) Applicant: MELLANOX TECHNOLOGIES TLV LTD., Raanana (IL)

(72) Inventors: Gil Levy, Hod Hasharon (IL); Alex Shpiner, Nesher (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 33 days.

(21) Appl. No.: 15/152,077

(22) Filed: May 11, 2016

(65) Prior Publication Data

US 2017/0331740 A1    Nov. 16, 2017

(51) Int. Cl.
  *H04L 12/801*    (2013.01)
  *H04L 12/947*    (2013.01)
  *H04L 12/707*    (2013.01)

(52) U.S. Cl.
  CPC .............. *H04L 47/12* (2013.01); *H04L 45/22* (2013.01); *H04L 49/25* (2013.01)

(58) Field of Classification Search
  None
  See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |
| 6,169,741 B1 | 1/2001 | Lemaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |
| 6,775,268 B1 | 8/2004 | Wang et al. |

(Continued)

FOREIGN PATENT DOCUMENTS

WO    2016105446 A1    6/2016

OTHER PUBLICATIONS

U.S. Appl. No. 14/745,488 Office Action dated Dec. 6, 2016.
(Continued)

*Primary Examiner* — Jeffrey M Rutkowski
*Assistant Examiner* — Chae S Lee
(74) *Attorney, Agent, or Firm* — D. Kligler IP Services LTD.

(57) ABSTRACT

Communication apparatus includes multiple interfaces configured to be connected to respective links in a packet data network. Switching circuitry in the apparatus is coupled between the interfaces and is configured to receive, via a first interface among the multiple interfaces, an adaptive routing notification (ARN) requesting that a specified flow of packets from a given source to a given destination in the network be rerouted. The switching circuitry is configured, upon verifying that the first interface serves as an egress interface for the packets in the specified flow, to reroute the specified flow through a different, second interface among the multiple interfaces when there is an alternative route available in the network from the second interface to the given destination, and after finding that there is no alternative route available from any of the interfaces to the given destination, to forward the ARN to a plurality of the interfaces.

20 Claims, 3 Drawing Sheets

(56) References Cited

U.S. PATENT DOCUMENTS

| | | |
|---|---|---|
| 6,795,886 B1 | 9/2004 | Nguyen |
| 6,804,532 B1 | 10/2004 | Moon et al. |
| 6,807,175 B1 | 10/2004 | Jennings et al. |
| 6,831,918 B1 | 12/2004 | Kavak |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,234,001 B2 | 6/2007 | Simpson et al. |
| 7,274,869 B1* | 9/2007 | Pan .................. H04B 10/032 398/17 |
| 7,286,535 B2 | 10/2007 | Ishikawa et al. |
| 7,676,597 B2 | 3/2010 | Kagan et al. |
| 7,746,854 B2 | 6/2010 | Ambe et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,755,389 B1 | 6/2014 | Poutievski et al. |
| 8,774,063 B2 | 7/2014 | Beecroft |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,571,400 B1 | 2/2017 | Mandal et al. |
| 2001/0043614 A1 | 11/2001 | Viswanadham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0223453 A1 | 12/2003 | Stoler et al. |
| 2004/0024903 A1 | 2/2004 | Costatino et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0103534 A1 | 4/2009 | Malledant et al. |
| 2009/0119565 A1 | 5/2009 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1* | 11/2010 | Assarpour ............... H04L 45/00 370/389 |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1* | 11/2012 | Xi .................. H04L 43/0882 370/237 |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2014/0043959 A1 | 2/2014 | Owens et al. |
| 2014/0140341 A1 | 5/2014 | Bataineh et al. |
| 2014/0192646 A1 | 7/2014 | Mir et al. |
| 2014/0198636 A1 | 7/2014 | Thayalan et al. |
| 2014/0211631 A1* | 7/2014 | Haramaty ............ H04L 47/122 370/237 |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0098466 A1 | 4/2015 | Haramaty et al. |
| 2015/0124815 A1 | 5/2015 | Beliveau et al. |
| 2015/0163144 A1* | 6/2015 | Koponen ............. H04L 47/125 370/237 |
| 2015/0172070 A1* | 6/2015 | Csaszar ............... H04L 12/1863 370/218 |
| 2015/0194215 A1 | 7/2015 | Douglas et al. |
| 2015/0195204 A1 | 7/2015 | Haramaty et al. |
| 2015/0372898 A1 | 12/2015 | Haramaty et al. |
| 2015/0372916 A1 | 12/2015 | Haramaty et al. |
| 2016/0014636 A1 | 1/2016 | Bahr et al. |
| 2016/0080120 A1 | 3/2016 | Unger et al. |
| 2016/0080321 A1 | 3/2016 | Pan et al. |

(56) References Cited

U.S. PATENT DOCUMENTS

| | | |
|---|---|---|
| 2016/0182378 A1 | 6/2016 | Basavaraja et al. |
| 2016/0294715 A1 | 10/2016 | Raindel et al. |
| 2017/0054591 A1 | 2/2017 | Hyoudou et al. |

OTHER PUBLICATIONS

U.S. Appl. No. 14/337,334 Office Action dated Oct. 20, 2016.
Dally et al., "Deadlock-Free Message Routing in Multiprocessor Interconnection Networks", IEEE Transactions on Computers, vol. C-36, No. 5, May 1987, pp. 547-553.
Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.
Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.
Evy et al., U.S. Appl. No. 15/050,480, filed Feb. 23, 2016.
U.S. Appl. No. 14/662,259 Office Action dated Sep. 22, 2016.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.
Infiniband Trade Association, "InfiniBandTM Architecture Specification vol. 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03),Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.
U.S. Appl. No. 14/046,976 Office Action dated Jun. 2, 2015.
Li et al., "Multicast Replication Using Dual Lookups in Large Packet-Based Switches", 2006 IET International Conference on Wireless, Mobile and Multimedia Networks, pp. 1-3, Nov. 6-9, 2006.
Nichols et al., "Definition of the Differentiated Services Field (DS Field) in the IPv4 and IPv6 Headers", Network Working Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
U.S. Appl. No. 12/910,900 Office Action dated Apr. 9, 2013.
U.S. Appl. No. 14/046,976 Office Action dated Jan. 14, 2016.
Nikposong et al., "Experiences with BGP in Large Scale Data Centers:Teaching an old protocol new tricks", 44 pages, Jan. 31, 3014.
"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Glass et al., "The turn model for adaptive routing", Journal of the ACM, vol. 41, No. 5, pp. 874-903, Sep. 1994.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over IntiniBand: An MPI Perspective", Seventh IEEE International Symposium on Cluster Computing and the Grid (CCGrid'07), 8 pages, year 2007.
NOWLAB—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modem High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Haramaty et al., U.S. Appl. No. 14/970,608 dated Dec. 16, 2015.
Afek et al., "Sampling and Large Flow Detection in SDN", SIGCOMM '15, pp. 345-346, Aug. 17-21, 2015, London, UK.
U.S. Appl. No. 14/970,608 Office Action dated May 30, 2017.
U.S. Appl. No. 14/673,892 Office Action dated Jun. 1, 2017.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
U.S. Appl. No. 14/732,853 Office Action dated Jan. 26, 2017.
U.S. Appl. No. 15/050,480 office action dated Jan. 22, 2018.
U.S. Appl. No. 15/387,718 office action dated Mar. 9, 2018.

(56) References Cited

OTHER PUBLICATIONS

U.S. Appl. No. 14/970,608 office action dated Nov. 1, 2017.
U.S. Appl. No. 15/356,588 office action dated Jul. 11, 2018.
U.S. Appl. No. 15/050,480 office action dated Nov. 2, 2018.

* cited by examiner

FORWARDING OF ADAPTIVE ROUTING NOTIFICATIONS

FIELD OF THE INVENTION

The present invention relates generally to data communication networks, and particularly to routing of data packets in such networks.

BACKGROUND

In some packet communication networks, adaptive routing is used by switching elements to choose the best path over which to send the packets in a given flow to their destination. (The term "switching elements" is used herein to refer network elements having multiple interfaces to the network, such as network ports, through which packets are received and transmitted, and logic for directing each received packet from its ingress to its appropriate egress interface. Switches, bridges and routers are some examples of such switching elements. A "flow" is a sequence of packets transmitted through the network from a particular source to a particular destination.) One of the objects of adaptive routing is congestion avoidance, meaning that when congestion is detected in the path of a given flow, the switching element routes the flow over a different path to the same destination.

U.S. Pat. No. 9,014,006, whose disclosure is incorporated herein by reference, describes a communication network in which each flow travels a certain route that traverses multiple switches and links. When a switch along the route detects an event that compromises its ability to forward the flow over the next link, such an event is referred to as an adaptive routing (AR) event, and may comprise, for example, link-fault, congestion or head-of-line time-out. Upon detecting an AR event, the detecting switch generates a packet referred to as an AR Notification (ARN), and sends the ARN backwards along the route. The ARN typically indicates the AR event to the preceding switches on the route of the flow, and requests that the preceding switches modify the route so as not to traverse the detecting switch.

When a preceding switch receives the ARN, it typically checks whether it is in a position to modify the route, and whether the flow in question is permitted to undergo AR. If so, the switch consumes the ARN and modifies the route. Otherwise, the switch forwards the ARN to the previous switch along the route. Typically, only one of the preceding switches should modify the route and consume the ARN, in order to avoid unnecessary blocking of ports.

U.S. Patent Application Publication 2015/0163144 describes a forwarding element that detects elephant flows by statistics or measurements relating to a data flow. An elephant flow represents a long-lived flow or a continuous traffic flow that is typically associated with high-volume connection. In distinction from an elephant flow, a mouse flow represents a short-lived flow. Mice are often associated with bursty, latency-sensitive applications, whereas elephants tend to be associated with large data transfers in which throughput is far more important than latency. The forwarding element marks each packet associated with a detected elephant flow in some manner to differentiate it from a packet associated with a mouse flow. Alternatively, the forwarding element breaks elephant flows into a number of mouse flows by sending packets associated with the detected elephant flow along different paths.

SUMMARY

Embodiments of the present invention that are described hereinbelow provide improved methods for forwarding packets in a network and apparatus implementing such methods.

There is therefore provided, in accordance with an embodiment of the invention, communication apparatus, including multiple interfaces configured to be connected to respective links in a packet data network and to serve as ingress interfaces and egress interfaces for data packets received from and transmitted to the respective links. Switching circuitry is coupled between the interfaces and is configured to receive, via a first interface among the multiple interfaces, an adaptive routing notification (ARN) requesting that a specified flow of packets from a given source to a given destination in the network be rerouted, and upon verifying that the first interface serves as an egress interface for the packets in the specified flow, to reroute the specified flow through a different, second interface among the multiple interfaces when there is an alternative route available in the network from the second interface to the given destination, and after finding that there is no alternative route available from any of the interfaces to the given destination, to forward the ARN to a plurality of the interfaces.

In some embodiments, the switching circuitry is configured to discard the ARN upon finding that the first interface is not the egress interface for the packets in the specified flow. In a disclosed embodiment, the switching circuitry is configured to maintain a forwarding database, indicating respective egress interfaces for flows conveyed through the apparatus and to forward the data packets to the respective egress interfaces responsively to entries in the forwarding database, and the switching circuitry is configured to look up the flow specified in the ARN in the forwarding database in order to ascertain whether the first interface serves as the egress interface for the packets in the specified flow.

In some embodiments, the switching circuitry is configured to forward the ARN to all of the interfaces other than the first interface when there is no alternative route available from any of the interfaces to the given destination.

Additionally or alternatively, the switching circuitry is configured to maintain a record of elephant flows conveyed through the apparatus, the record indicating respective ingress and egress interfaces of the elephant flows, and the switching circuitry is configured, when there is no alternative route available from any of the interfaces to the given destination and the specified flow appears in the record as an elephant flow, to forward the ARN only to the respective ingress interface indicated by the record for the specified flow, and not to all of the plurality of the interfaces.

There is also provided, in accordance with an embodiment of the invention, communication apparatus, including multiple interfaces configured to be connected to respective links in a packet data network and to serve as ingress interfaces and egress interfaces for data packets received from and transmitted to the respective links. Switching circuitry is coupled between the interfaces and is configured to maintain a record containing information with respect to elephant flows conveyed through the apparatus via the interfaces, and is configured to receive, via one of the multiple interfaces, an adaptive routing notification (ARN) requesting that a specified flow of packets in the network be rerouted, and in response to the ARN, to look up the specified flow in the record of the elephant flows and when the specified flow appears in the record, to service the ARN responsively to the record.

In some embodiments, the switching circuitry will service the ARN only if the specified flow is listed in the record of the elephant flows.

In some embodiments, the ARN indicates a destination of the specified flow, and the switching circuitry is configured, upon receiving the ARN via a first interface among the multiple interfaces, to service the ARN by rerouting the specified flow through a different, second interface among the multiple interfaces when there is an alternative route available in the network from the second interface to the indicated destination. In a disclosed embodiment, the information in the record of the elephant flows includes respective ingress interfaces of the elephant flow, and the switching circuitry is configured, when there is no alternative route available from any of the interfaces to the indicated destination, to forward the ARN to the respective ingress interface indicated by the record for the specified flow. The switching circuitry may be configured, when there is no alternative route available from any of the interfaces to the given destination, and the specified flow does not appear in the record as an elephant flow, to forward the ARN to all of the interfaces other than the first interface.

There is also provided, in accordance with an embodiment of the invention, a method for communication, which includes receiving, through a first interface among multiple interfaces of a switching element in a packet data network, an adaptive routing notification (ARN) requesting that a specified flow of packets from a given source to a given destination in the network be rerouted. The switching element verifies that the first interface serves as an egress interface for the packets in the specified flow, and when the first interface serves as the egress interface, reroutes the specified flow through a different, second interface among the multiple interfaces when there is an alternative route available in the network from the second interface to the given destination, and after finding that there is no alternative route available from any of the interfaces to the given destination, forwards the ARN to a plurality of the interfaces.

There is further provided, in accordance with an embodiment of the invention, a method for communication, which includes maintaining in a switching element having multiple interfaces connected to respective links in a packet data network a record containing information with respect to elephant flows conveyed through the switching element via the interfaces. The switching element receives, via one of the multiple interfaces, an adaptive routing notification (ARN) requesting that a specified flow of packets in the network be rerouted, and in response to the ARN, looks up the specified flow in the record of the elephant flows and when the specified flow appears in the record, services the ARN responsively to the record.

The present invention will be more fully understood from the following detailed description of the embodiments thereof, taken together with the drawings in which:

DETAILED DESCRIPTION OF EMBODIMENTS

Figure 1:
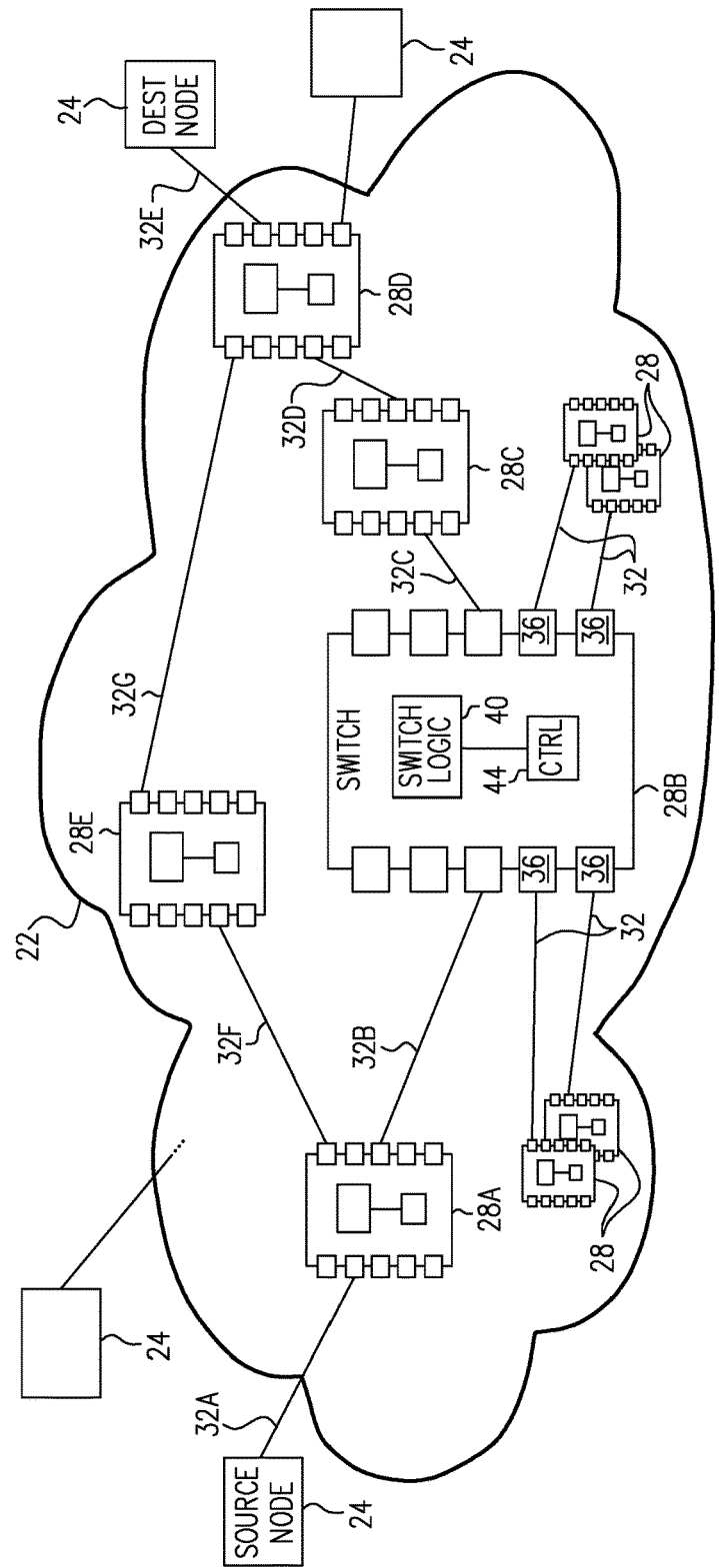
FIG. 1 is a block diagram that schematically illustrates a communication network that supports adaptive routing, in accordance with an embodiment of the present invention.

The use of Adaptive Routing Notification (ARN), as described in the above-mentioned U.S. Pat. No. 9,014,006, provides a highly-effective alternative to local adaptive routing (AR), in which packets are simply rerouted to a different output port of the switch that detects congestion, and global AR, which requires network-wide notification of AR events and network-wide rerouting. ARN enables switching elements to resolve AR events semi-locally by the switching elements along the route of a congested flow. Since the response is semi-local, AR events are resolved quickly, before they escalate and become significant network bottlenecks.

To forward an ARN with respect to a congested flow in the manner specified in U.S. Pat. No. 9,014,006, the switching element must first choose the correct interface through which the ARN packet should be transmitted in order to reach the preceding switching element along the route of the flow. This choice is not trivial, since routes in the network are not symmetrical, i.e., the route followed by a certain packet flow from a source node to its destination node is generally not simply a mirror image of the route of another flow from the destination node to the source node. One solution to this problem is for the switching element, after detecting congestion on a given flow, to wait for the next packet in the flow in question and thus identify the ingress interface through which the packet entered the switching element, and then transmit the ARN packet through this interface. In this case, however, transmission of the ARN packet and hence, resolution of the AR event, will be delayed by at least the amount of time it takes for the next packet in the flow to arrive. The switching element must in the meanwhile allocate memory and processing resources to the problem.

Embodiments of the present invention that are described herein provide methods and apparatus that enable more rapid distribution of ARN packets, and thus facilitate earlier resolution of AR events. The embodiments are implemented in communication apparatus, such as a switching element, having multiple interfaces, which are connected to respective links in a packet data network and serve as ingress interfaces and egress interfaces for data packets received from and transmitted to the respective links. Switching circuitry in the switching elements forwards data packets between the interfaces and also generates and handles ARN packets (also referred to herein simply as ARNs).

In some embodiments, when a switching element is unable to reroute a flow and creates an ARN, or receives an ARN and is unable to reroute the flow specified by the ARN, the switching element forwards the ARN concurrently to multiple interfaces—and possibly broadcasts the ARN to all of its interfaces other than the interface through which the ARN in question was received. This approach saves time in responding to AR events, since upon receiving an ARN and finding that it has no alternative route available from any of its interfaces to the destination of the flow specified by the ARN, the switching element can forward the ARN immediately without spending time on resolving the actual ingress port of the flow. As a consequence of this approach, however, switching elements will receive many ARNs that do not actually apply to any of the flows that they are forwarding.

Therefore, the switching circuitry filter ARNs that are received in the switching element and discards ARNs that do not apply to a flow that is forwarded by the switching element. For this purpose, before attempting to service the ARN, the switching circuitry first verifies that the interface through which the ARN was received actually serves as the egress interface for the packets in the specified flow. (This information is generally available in the forwarding table that the switching circuitry maintains for all flows that it transmits.) When the ARN is verified as applying to a flow forwarded by the switching element, the switching circuitry will attempt to reroute the specified flow through another interface when there is an alternative route available from that interface to the given destination. Otherwise, after finding that there is no such alternative route available, the switching circuitry will forward the ARN to multiple interfaces of the switching element as described above, and the process will continue at the next tier of switching elements.

Additionally or alternatively, the switching circuitry handles ARNs using information that it collects with respect to elephant flows. (The term "elephant flow" is used herein in the conventional sense, to refer to a packet flow in which the rate of data or packets transmitted through a switching element exceeds a certain predefined threshold for at least a certain minimum length of time. The threshold is typically taken to be one, two or more standard deviations above the mean rate of all flows.) These embodiments take advantage of the fact that many modern switching elements maintain a record containing information with respect to the elephant flows that are conveyed through their interfaces, for example for purposes of managing quality of service and/or other sorts of network resource allocation. As elephant flows account for the largest share of network traffic, AR is generally most effective in relieving congestion when it is applied specifically to elephant flows.

Therefore, in some embodiments, upon receiving an ARN, the switching circuitry looks up the flow specified by the ARN in its record of elephant flow, and applies the information from this record in servicing the ARN. This elephant flow information may be applied separately from or in conjunction with the ARN broadcast and filtering technique described above. In the former case, the elephant flow record may be used alone, such that the switching circuitry will handle ARNs that it receives only if the flow specified by the ARN is listed in the record of elephant flows.

In either case, upon receiving an ARN and finding that it has no alternative route available to the destination of the specified flow, the switching circuitry looks up the flow in its record of elephant flows. The information in this record typically includes the ingress interface of each elephant flow into this switching element. Upon finding that the specified flow is listed as an elephant flow, the switching circuitry reads the ingress interface of the flow from the record and forwards the ARN only to the ingress interface. If the flow is not listed as an elephant flow, the switching circuitry can forward the ARN to multiple interfaces, as described above, or it may attempt to forward the ARN by other means.

FIG. 1 is a block diagram that schematically illustrates a communication system 22 that uses Adaptive Routing Notification (ARN), in accordance with an embodiment of the present invention. System 20 is built on a network 22, which operates in accordance with the InfiniBand® or IEEE 802.1 (Ethernet) specifications, for example. Alternatively, network 22 may operate in accordance with other suitable communication standards or protocols.

System 20 provides packet communication among multiple nodes 24 having suitable network interface controllers (NICs). Each flow of packets in network 22 originates from a certain source node and is addressed to a certain destination node. The packets of the flow are forwarded over a route through network 22 that traverses various switches 28 and network links 32 (which are assumed to be bidirectional). In order to demonstrate the disclosed techniques, FIG. 1 shows a simplified example of routes between a source node and a destination node via switches 28A . . . 28E and links 32A . . . 32G. Switches 28 are shown as an example of switching elements, and may comprise bridges or routers, for example.

Each switch 28 comprises multiple interfaces, shown as ports 36 in this example, which are connected to receive and transmit packets over respective links 32. Switching logic 40 is coupled to forward the packets between ports 36 in each switch, under the control of a control unit 44. Among other tasks, control unit 44 carries out the AR techniques and notifications that are described in detail herein. Although the description that follows refers to a certain partitioning of functions between switching logic and control unit 44, in alternative embodiments any other suitable functional partitioning can be used. In the context of the present description and in the claims, switching logic 40 and control unit 44 are referred to collectively as "switching circuitry," which implements the techniques described herein.

The configurations of network 22 and switches 28 configurations shown in FIG. 1 are example configurations, which are chosen purely for the sake of conceptual clarity. In alternative embodiments, any other suitable network and/or switch configuration can be used. Certain elements of switches 28 are typically implemented in hard-wired or programmable logic circuits, such as using one or more Application-Specific Integrated Circuits (ASICs) or Field-Programmable Gate Arrays (FPGAs). Alternatively or additionally, some functions of switches 28 may be implemented in software or firmware running on a programmable processor that is a part of control unit 44.

In operation of system 20, the route from a source node to a destination node may at some point become unsuitable or compromised in its ability to transfer packets. A scenario of this sort may occur due to various events, such as congestion, link fault or head-of-line time-out. The techniques that are disclosed herein adapt the route of the packets in response to detecting such an event.

Any event that triggers a change of route is referred to herein as an "AR event." In this context, the term "congestion" refers to various scenarios in which the bandwidth of a port 36 or link 32 is insufficient for transferring the traffic volume forwarded over this port or link. The term "fault" refers to various scenarios in which a permanent or temporary equipment failure in a link or port prevents the link or port from transferring packets. The term "head-of-line time-out" refers to scenarios in which packets are delayed in the queues of a switch by more than a permitted time. The description that follows refers to link fault and link congestion for the sake of simplicity. Generally, however, fault or congestion in a link may be caused by the link itself, or by the ports or other switch elements associated with the link.

Typically, an AR event is detected by one of switches 28 along the route of a given flow when it attempts to output packets in the flow via the designated egress port 36. In the example scenario of FIG. 1, the route defined from the source node to the destination node traverses links 32A, 32B, 32C, 32D and 32E. The packets along this route are forwarded by switches 28A, 28B, 28C and 28D. In this example, switch 28C detects an AR event on link 32D when attempting to forward packets over link 32D to switch 28D. The switch detecting the AR event is referred to as the detecting switch or identifying switch. The switches along the route between the source node and the detecting switch are referred to herein as preceding switches. Thus, in the pictured example, switch 28C is the detecting switch, and switches 28A and 28B are the preceding switches.

Upon detecting an AR event, the detecting switch generates a notification packet that is referred to as an Adaptive Routing Notification (ARN). In the present embodiment, the AR event is detected with regard to a packet or multiple packets of a certain flow, having a certain source address and a destination address. In response to the AR event, detecting switch 28C generates and transmits an ARN comprising parameters such as the identity of the detecting switch, the type of AR event (such as congestion or link fault), and a flow identifier, including the source and destination addresses and source and destination ports of the flow that triggered the AR event, for example. The ARN typically has a unique identifier that distinguishes it from other packet types.

Detecting switch 28C attempts to send the ARN so that it propagates backwards along the route to the preceding switches, in order to notify the preceding switches that an AR event has been detected and request that they modify the route so as not to traverse the detecting switch. Each preceding switch 28B, 28A that receives the ARN evaluates whether it can reroute the specified flow so as to circumvent the detecting switch. If a preceding switch decides it can reroute the flow, it does so and consumes the ARN. Otherwise, the preceding switch forwards the ARN further back along the route. For this purpose, when the flow is listed in a record of elephant flows maintained by control unit 44, the control unit may direct switch logic 40 to transmit the ARN through the ingress port indicated by the record. Otherwise, control unit 44 may direct switch logic 40 to forward the ARN through multiple ports 36, and possibly through all of the ports other than the port through which the ARN was received.

In the example shown in FIG. 1, packets in a given flow from a source node to a destination node are initially forwarded over links 32A, 32B, 32C, 32D and 32E, i.e., via switches 28A, 28B, 28C and 28D, as noted above. Upon detecting an AR event on link 32D, switch 28C generates and sends an ARN with respect to the given flow backward over link 32C to switch 28B (and possibly over other links, as well). If the port of switch 28C that is connected to link 32C is known in switch 28C to be the ingress port of the flow (for example, by virtue of being listed in the elephant flow record of switch 28C), the ARN may be sent only over link 32C. Otherwise, switch 28C may send the ARN over multiple links 32 to multiple different switches 28.

Upon receiving the ARN over link 32C, switch 28B first filters the ARN in order to verify that the port 36 that is connected to link 32C is indeed the egress interface for the specified flow. Switch 28B then decides, however, that it has no alternative route available to the destination node of this flow. Switch 28B therefore forwards the ARN onward via links 32 to multiple other switches 28, including switch 28A.

Switch 28A receives the ARN, verifies that the port 36 connected to link 32B is the egress interface for the specified flow, and decides that it is able to reroute the flow. The modified route to the destination node passes through link 32F, switch 28E, link 32G, switch 28D and link 32E. Switch 28A modifies the route so as not to traverse switch 28C and forwards subsequent traffic in the specified flow via the modified route.

Figure 2:
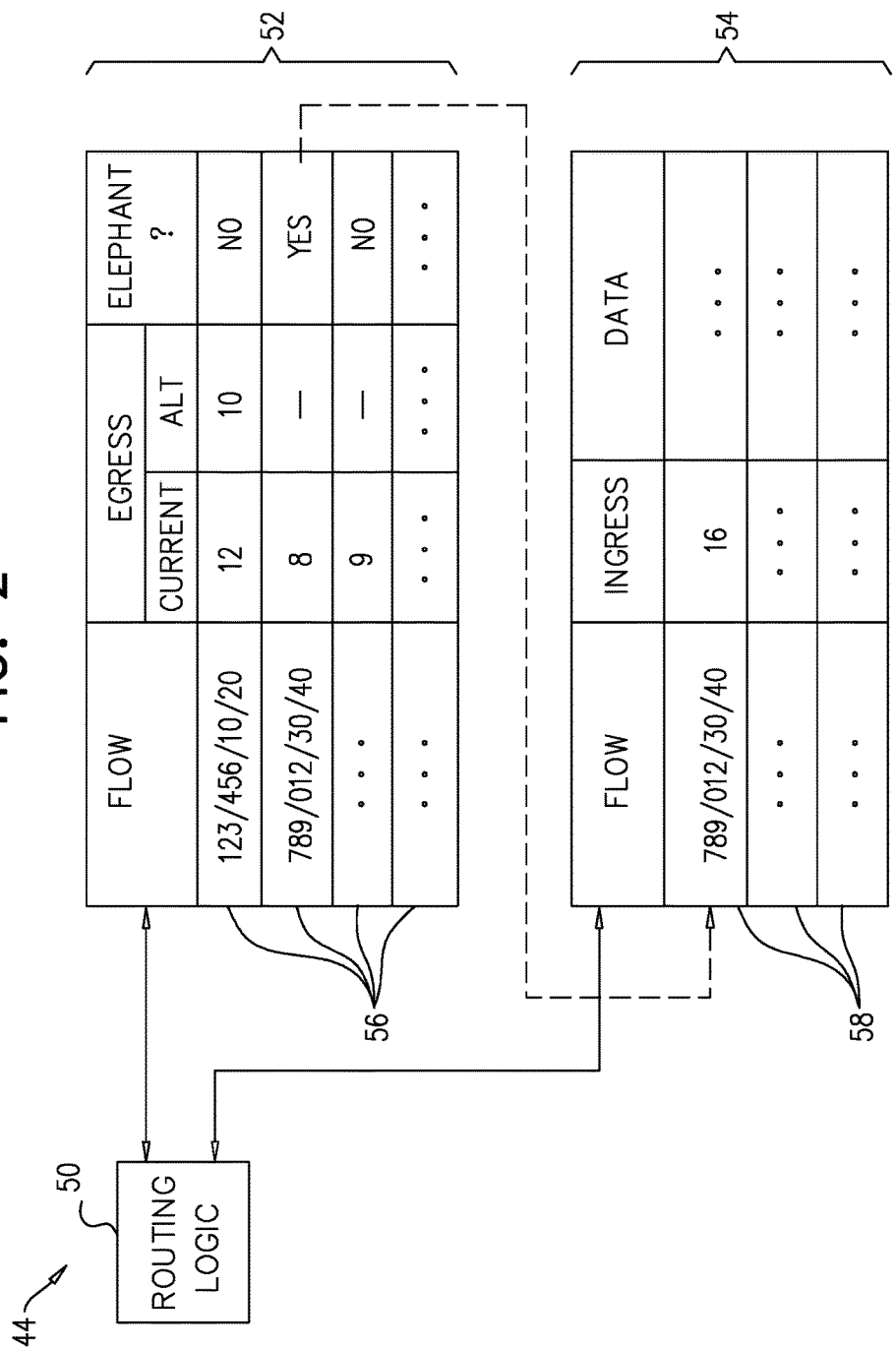
FIG. 2 is a block diagram that schematically illustrates control circuitry used in a network switch, in accordance with an embodiment of the invention.

FIG. 2 is a block diagram that schematically shows details of control unit 44, in accordance with an embodiment of the invention. Control unit 44 comprises routing logic 50, which maintains a forwarding database (FDB) 52 for use in selecting the egress interfaces through which packets in multiple different flows are to be forwarded. (FDB 52 is also referred to as a "forwarding table" or "flow table.") Each entry 56 in FDB 52 is keyed to a given flow, which is identified in this example by its source and destination addresses and source and destination ports, as is known in the art. Each entry 56 also indicates the current egress interface through which packets in this flow are to be forwarded, and possibly also an alternate egress interface that can be used when rerouting of the flow is required, for example due to an AR event.

In addition, in the pictured embodiment, control unit 44 maintains a record of elephant flows, in an elephant cache 54. Entries 56 in forwarding database 52 may contain an elephant flag, indicating that the flow in question has a corresponding entry 58 in elephant cache 54. Entries 58 include a flow identifier along with flow information, including an identification of the ingress port through which the flow enters the switch and possibly other flow data, such as statistics of data volume and numbers of packets transmitted in the elephant flow.

Methods for detection and monitoring of elephant flows that may be used in populating and updating elephant cache 54 are known in the art. For example, the above-mentioned US 2015/0163144 states that forwarding elements may track the number of bytes sent in data flows, and specify, based on the number of bytes, whether a data flow should be classified as elephant flow. Control unit 44 can monitor data flow by tracking statistics associated with entries 56 in forwarding database 52. In this regard, control unit 44 can in some cases apply techniques that are described by Afek et al., in "Sampling and Large Flow Detection in SDN," SIGCOMM '15 (Aug. 17-21, 2015), pages 345-346, which is incorporated herein by reference.

In some embodiments, switches 28 in system 20 apply adaptive routing only to elephant flows, i.e., only to flows appearing in elephant cache 54 in the present example. In this case, if control unit 44 receives an ARN with respect to a flow that does not have a corresponding entry 58 in elephant cache 54, the ARN will be ignored and discarded.

Alternatively, control unit 44 may use only forwarding database 52 in adaptive routing, either because switch 28 does not contain an elephant cache 54 or because the network policy in system 20 is to apply adaptive routing without regard to flow size, for example. In this case, ARN packets will be transmitted through multiple ports 36 of switches along the flow path.

Figure 3:
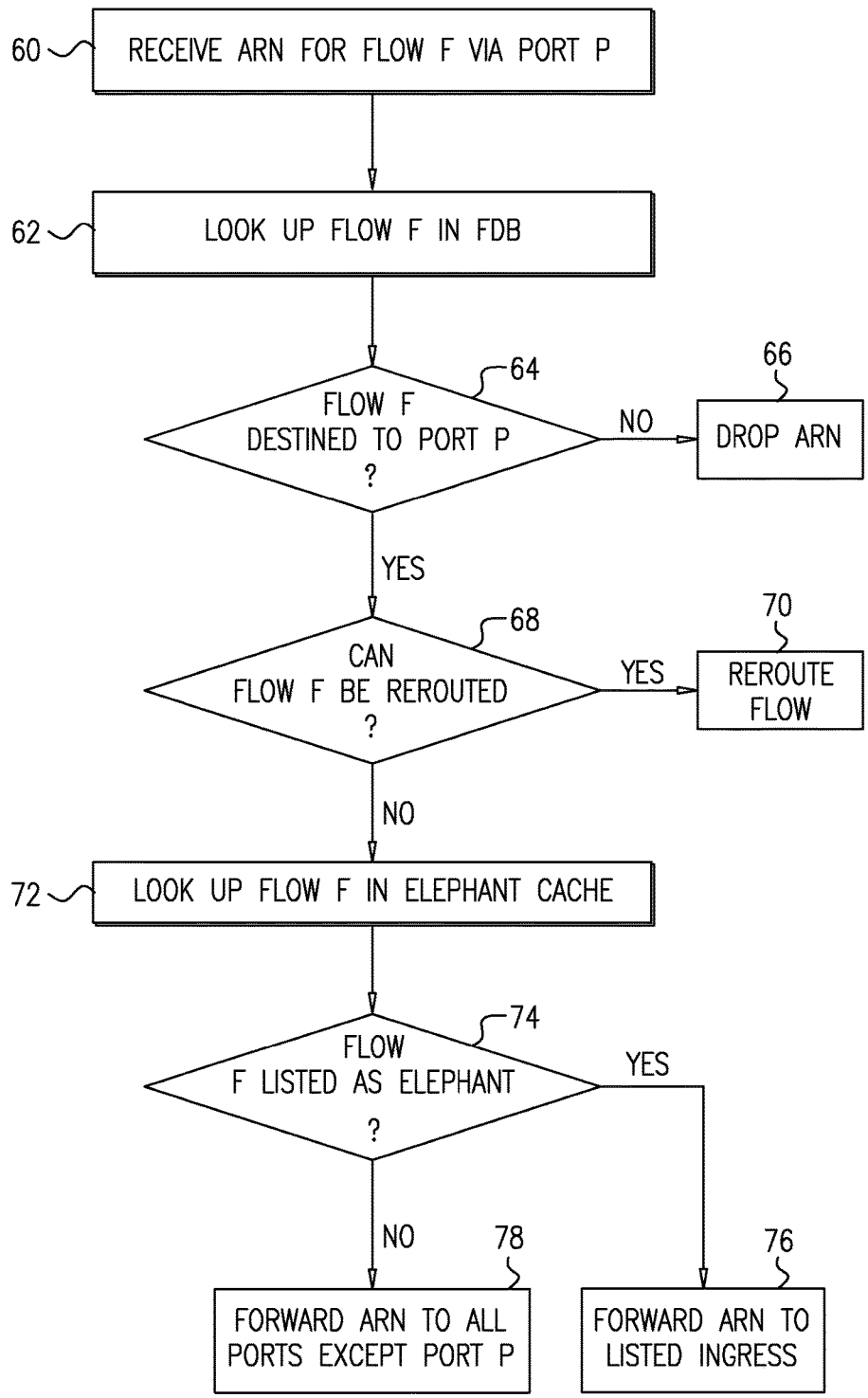
FIG. 3 is a flow chart that schematically illustrates a method for communication using ARN, in accordance with an embodiment of the present invention.

FIG. 3 is a flow chart that schematically illustrates a method for communication using ARN, in accordance with an embodiment of the present invention in which a switching element applies adaptive routing to all flows, while giving special treatment to elephant flows. This method is described, for the sake of convenience and clarity, with reference to the elements of system 20 and particularly switch 28C in FIG. 1, and using the data structures that are shown in FIG. 2. Alternatively, the principles of this method may be applied, mutatis mutandis, in other sorts of switching elements and networks, with or without special treatment of elephant flows, as explained above.

The method of FIG. 3 is initiated when switch 28C receives an ARN for a specified flow, F, via a given port P that is connected to link 32D, at an ARN reception step 60. It is assumed that switch 28D distributed the ARN to multiple ports 36, and there is therefore no assurance that switch 28C is actually on the path of the specified flow. To decide how to handle the ARN, control unit 44 looks up the flow identifier in forwarding database 52, at a flow lookup step 62. Based on the corresponding entry 56, control unit 44 ascertains whether port P is designated as the egress interface for the packets in flow F, at an egress checking step 64. If not, control unit 44 drops this ARN and takes no further action, at an ARN filtering step 66.

Upon finding at step 64 that the flow F specified by this ARN is indeed destined to port P, control unit 44 checks whether there is an alternative route available, through another port 36 of switch 28B, to the destination of flow F, at a rerouting evaluation step 68. In the example shown in FIG. 2, such alternative routes are calculated in advance, and the egress ports for such routes are listed in forwarding database 52, as illustrated in the first entry 56 in the database. Alternatively or additionally, control unit 44 may attempt to compute alternative routes on the fly or may query a network controller (not shown) in response to the ARN. In any case, if an alternative route exists, switch 28B reroutes the specified flow, at a rerouting step 70.

If control unit 44 was unable to reroute the flow, it next looks up flow F in elephant cache 54, at an elephant lookup step 72. (Equivalently, the control unit may check the elephant flag in the corresponding entry 56 in forwarding database 52.) Control unit 44 thus determines whether flow F is an elephant flow, at an elephant identification step 74. If so, the control unit reads the number of the ingress port that is indicated in entry 58 of elephant cache 54 for flow F, and forwards the ARN to the listed ingress port, at an ingress identification step 76. In the example shown in FIG. 1, the ARN will thus be forwarded over link 32B to switch 28A.

In the alternative, when flow F is not identified as an elephant flow at step 74, control unit 44 forwards the ARN to all ports 36 of switch 28B other than port P (through which switch 28B received the ARN from switch 28C), at an ARN broadcast step 78. In this case, the ARN will be forwarded over multiple links 32 to multiple different switches 28. All of these switches will filter and discard the ARN, with the exception of switch 28A, which is on the path of flow F. In the pictured example, switch 28A will now reroute the flow to link 32F, as explained above.

In alternative embodiments, either of the ARN broadcast approach and the elephant identification approach can be used by itself, independently of the other approach. In other words, in one embodiment, the steps of the method relating to elephant flows (steps 72 and 74) can be eliminated, while in another embodiment, the ARN broadcast (step 78) can be eliminated. All such alternative embodiments are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
   multiple interfaces configured to be connected to respective links in a packet data network and to serve as ingress interfaces and egress interfaces for data packets received from and transmitted to the respective links; and
   switching circuitry, which is coupled between the interfaces and is configured to receive, via a first interface among the multiple interfaces, an adaptive routing notification (ARN) requesting that a specified flow of packets from a given source to a given destination in the network be rerouted, to ascertain whether the first interface serves as an egress interface for the packets of the specified flow and upon ascertaining that the first interface serves as an egress interface for the packets in the specified flow:
      to reroute the specified flow through a different, second interface among the multiple interfaces when there is an alternative route available in the network from the second interface to the given destination, and
      after finding that there is no alternative route available from any of the interfaces to the given destination, to forward the ARN concurrently to a plurality of the interfaces;
   wherein the switching circuitry is configured to discard the ARN upon finding that the first interface is not the egress interface for the packets in the specified flow.

2. The apparatus according to claim 1, wherein the switching circuitry is configured to maintain a forwarding database, indicating respective egress interfaces for flows conveyed through the apparatus and to forward the data packets to the respective egress interfaces responsively to entries in the forwarding database, and
   wherein the switching circuitry is configured to look up the flow specified in the ARN in the forwarding database in order to ascertain whether the first interface serves as the egress interface for the packets in the specified flow.

3. The apparatus according to claim 1, wherein the switching circuitry is configured to forward the ARN to all of the interfaces other than the first interface when there is no alternative route available from any of the interfaces to the given destination.

4. The apparatus according to claim 1, wherein the switching circuitry is configured to maintain a list of elephant flows conveyed through the apparatus, the list indicating respective ingress and egress interfaces of the elephant flows, and
   wherein the switching circuitry is configured, when there is no alternative route available from any of the interfaces to the given destination and the specified flow appears in the list as an elephant flow, to forward the ARN only to the respective ingress interface indicated by the list for the specified flow, and not to all of the plurality of the interfaces.

5. Communication apparatus, comprising:
   multiple interfaces configured to be connected to respective links in a packet data network and to serve as ingress interfaces and egress interfaces for data packets received from and transmitted to the respective links; and
   switching circuitry, which is coupled between the interfaces and is configured to track the amount of data sent in data flows passing through the apparatus, to maintain a list of elephant flows conveyed through the apparatus via the interfaces, having a rate of data or packets above a threshold, and to manage network resource allocation responsive to the list of elephant flows,
   wherein the switching circuitry is further configured to receive, via one of the multiple interfaces, an adaptive routing notification (ARN) requesting that a specified flow of packets in the network be rerouted, and in response to the ARN, to look up the specified flow in the list of the elephant flows and when the specified flow appears in the list, to service the ARN responsively to the list, wherein the switching circuitry is configured to determine whether the specified flow of packets can be rerouted by the apparatus and to look up the specified flow in the list of the elephant flows only if determined that the specified flow cannot be rerouted by the apparatus.

6. The apparatus according to claim 5, wherein the switching circuitry will service the ARN only if the specified flow is in the list of the elephant flows.

7. The apparatus according to claim 5, wherein the ARN indicates a destination of the specified flow, and wherein the switching circuitry is configured, upon receiving the ARN via a first interface among the multiple interfaces, to service the ARN by rerouting the specified flow through a different, second interface among the multiple interfaces when there is an alternative route available in the network from the second interface to the indicated destination.

8. The apparatus according to claim 7, wherein the list of the elephant flows comprises respective ingress interfaces of the elephant flows, and
wherein the switching circuitry is configured, when there is no alternative route available from any of the interfaces to the indicated destination, to forward the ARN to the respective ingress interface indicated by the list for the specified flow.

9. The apparatus according to claim 8, wherein the switching circuitry is configured, when there is no alternative route available from any of the interfaces to the given destination, and the specified flow does not appear in the list as an elephant flow, to forward the ARN to all of the interfaces other than the first interface.

10. A method for communication, comprising:
receiving, through a first interface among multiple interfaces of a switching element in a packet data network, an adaptive routing notification (ARN) requesting that a specified flow of packets from a given source to a given destination in the network be rerouted;
verifying that the first interface serves as an egress interface for the packets in the specified flow; and
when the first interface serves as the egress interface:
rerouting the specified flow through a different, second interface among the multiple interfaces when there is an alternative route available in the network from the second interface to the given destination; and
after finding that there is no alternative route available from any of the interfaces to the given destination, forwarding the ARN to a plurality of the interfaces;
wherein verifying that the first interface serves as the egress interface comprises discarding the ARN upon finding that the first interface is not the egress interface for the packets in the specified flow.

11. The method according to claim 10, and comprising maintaining in the switching element a forwarding database, indicating respective egress interfaces for flows conveyed through the switching element and forwarding data packets to respective egress interfaces responsively to entries in the forwarding database,
wherein verifying that the first interface serves as the egress interface comprises looking up the flow specified in the ARN in the forwarding database in order to ascertain whether the first interface serves as the egress interface for the packets in the specified flow.

12. The method according to claim 10, wherein forwarding the ARN comprises transmitting the ARN through all of the interfaces other than the first interface when there is no alternative route available from any of the interfaces to the given destination.

13. The method according to claim 10, and comprising maintaining in the switching element a list of elephant flows conveyed through the switching element, the list indicating respective ingress and egress interfaces of the elephant flows, and when there is no alternative route available from any of the interfaces to the given destination and the specified flow appears in the list as an elephant flow, forwarding the ARN only to the respective ingress interface indicated by the list for the specified flow, and not to all of the plurality of the interfaces.

14. A method for communication, comprising:
tracking in a switching element, having multiple interfaces connected to respective links in a packet data network, an amount of data sent in data flows passing through the apparatus;
maintaining in the switching element, a list of elephant flows, having a rate of data or packets above a threshold, conveyed through the switching element via the interfaces;
managing, in the switch element, network resource allocation responsive to the list of elephant flows;
receiving in the switching element, via one of the multiple interfaces, an adaptive routing notification (ARN) requesting that a specified flow of packets in the network be rerouted;
determining whether the specified flow of packets can be rerouted by the apparatus; and
only if determined that the specified flow cannot be rerouted by the apparatus, looking up the specified flow in the list of the elephant flows and when the looking up finds that the specified flow appears in the list, servicing the ARN responsively to the list.

15. The method according to claim 14, wherein servicing the ARN comprises applying adaptive routing to the specified flow or forwarding the ARN only if the specified flow is listed in the list of the elephant flows.

16. The method according to claim 14, wherein the ARN indicates a destination of the specified flow and is received through a first interface among the multiple interfaces of the switching element, and
wherein servicing the ARN comprises rerouting the specified flow through a different, second interface among the multiple interfaces when there is an alternative route available in the network from the second interface to the indicated destination.

17. The method according to claim 16, wherein the information in the list of the elephant flows comprises respective ingress interfaces of the elephant flows, and
wherein servicing the ARN comprises, when there is no alternative route available from any of the interfaces to the indicated destination, forwarding the ARN to the respective ingress interface indicated by the list for the specified flow.

18. The method according to claim 17, and comprising, when there is no alternative route available from any of the interfaces to the given destination, and the specified flow does not appear in the list as an elephant flow, forwarding the ARN to all of the interfaces other than the first interface.

19. The method according to claim 14, wherein managing, in the switch element, network resource allocation comprises managing quality of service of flows handled by the switch element.

20. Communication apparatus, comprising:
multiple interfaces configured to be connected to respective links in a packet data network and to serve as ingress interfaces and egress interfaces for data packets received from and transmitted to the respective links; and switching circuitry, which is coupled between the interfaces and is configured to track the amount of data sent in data flows passing through the apparatus, to maintain a list of elephant flows conveyed through the apparatus via the interfaces, having a rate of data or packets above a threshold, and to manage network resource allocation responsive to the list of elephant flows, wherein the switching circuitry is further configured to receive, via one of the multiple interfaces, an adaptive routing notification (ARN) requesting that a specified flow of packets in the network be rerouted, and in response to the ARN, to look up the specified flow in the list of the elephant flows and when the specified flow appears in the list, to service the ARN responsively to the list, wherein the switching circuitry is configured to determine whether the one of the multiple interfaces through which the ARN was received is designated as the egress interface for the specified flow and to look up the specified flow in the list of the elephant flows only if determined that the one of the multiple interfaces through which the ARN was received is designated as the egress interface for the specified flow.

* * * * *